US008286915B2

(12) United States Patent
Depeige et al.

(10) Patent No.: US 8,286,915 B2
(45) Date of Patent: Oct. 16, 2012

(54) AIRCRAFT COMPRISING A WINDOW PANEL

(75) Inventors: Alain Depeige, Tournefeuille (FR); Jean-Claude Lacombe, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 376 days.

(21) Appl. No.: 12/400,359

(22) Filed: Mar. 9, 2009

(65) Prior Publication Data
US 2009/0230246 A1 Sep. 17, 2009

(30) Foreign Application Priority Data

Mar. 10, 2008 (FR) ..................................... 08 51526

(51) Int. Cl.
*B64C 1/14* (2006.01)
*B64C 1/06* (2006.01)
(52) U.S. Cl. ................... 244/129.3; 244/129.4; 244/131
(58) Field of Classification Search ............... 244/129.3, 244/129.4, 131, 119; 52/786.12
See application file for complete search history.

(56) References Cited

U.S. PATENT DOCUMENTS

| 4,324,373 A * | 4/1982 | Zibritosky ..................... 244/121 |
| 4,498,325 A * | 2/1985 | Reccius et al. .................. 72/302 |
| 5,271,581 A * | 12/1993 | Irish ........................... 244/129.3 |
| 5,884,865 A * | 3/1999 | Scherer et al. .............. 244/129.3 |
| 6,168,112 B1 * | 1/2001 | Mueller et al. .............. 244/129.3 |
| 6,938,858 B1 * | 9/2005 | Schneider et al. .......... 244/158.3 |
| 7,028,950 B2 * | 4/2006 | Salmon et al. ............. 244/129.3 |
| 7,059,656 B2 * | 6/2006 | Mikkaichi et al. ........ 296/146.15 |
| 7,552,896 B2 * | 6/2009 | Coak ........................... 244/129.3 |
| 2003/0234322 A1 * | 12/2003 | Bladt et al. ................. 244/129.3 |
| 2007/0194177 A1 * | 8/2007 | Coak ........................... 244/129.3 |
| 2007/0228217 A1 * | 10/2007 | Bold ........................... 244/129.3 |

FOREIGN PATENT DOCUMENTS

| WO | WO 00/20275 | 4/2000 |
| WO | WO 2005/115841 A1 | 12/2005 |

* cited by examiner

*Primary Examiner* — Robert Canfield
*Assistant Examiner* — Jessie Fonseca
(74) *Attorney, Agent, or Firm* — Oblon, Spivak, McClelland, Maier & Neustadt, L.L.P.

(57) ABSTRACT

An aircraft having a fuselage of composite type and more particularly to that of aircraft fuselage panels bearing cabin windows. The invention thus concerns a fuselage panel bearing a window comprising a composite structure cast in one piece, the structure comprising a main portion and at least one opening to accommodate a window, the structure having, on a zone surrounding the opening, a thickness more or less constant and greater than the thickness of the main portion of the structure. The invention also concerns an aircraft comprising a composite fuselage, the latter comprising such a panel or a similar panel made of metal material.

11 Claims, 3 Drawing Sheets

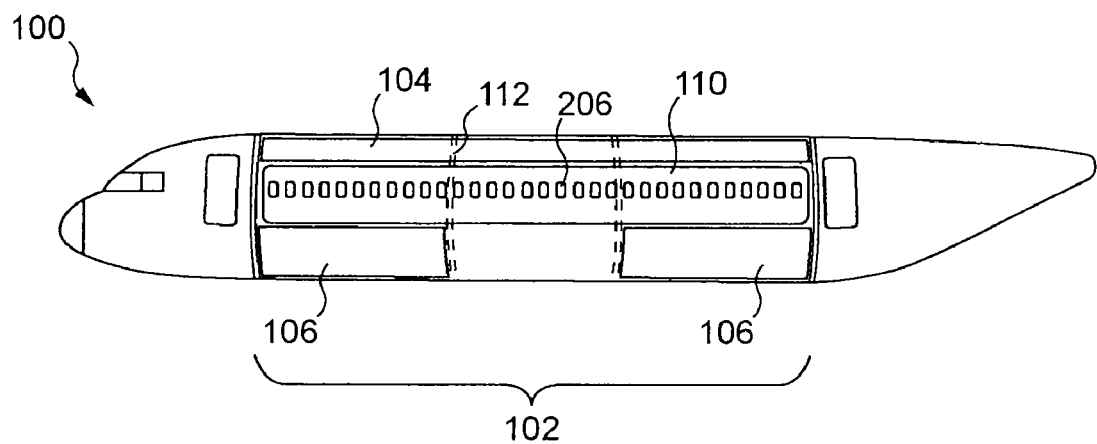
Fig. 2
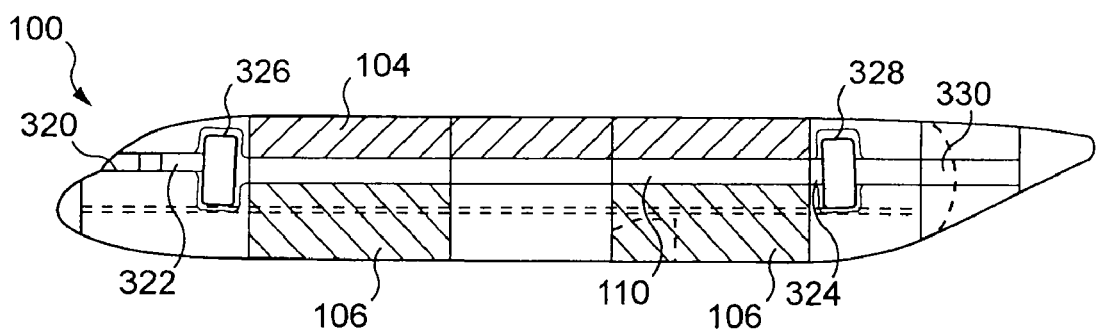
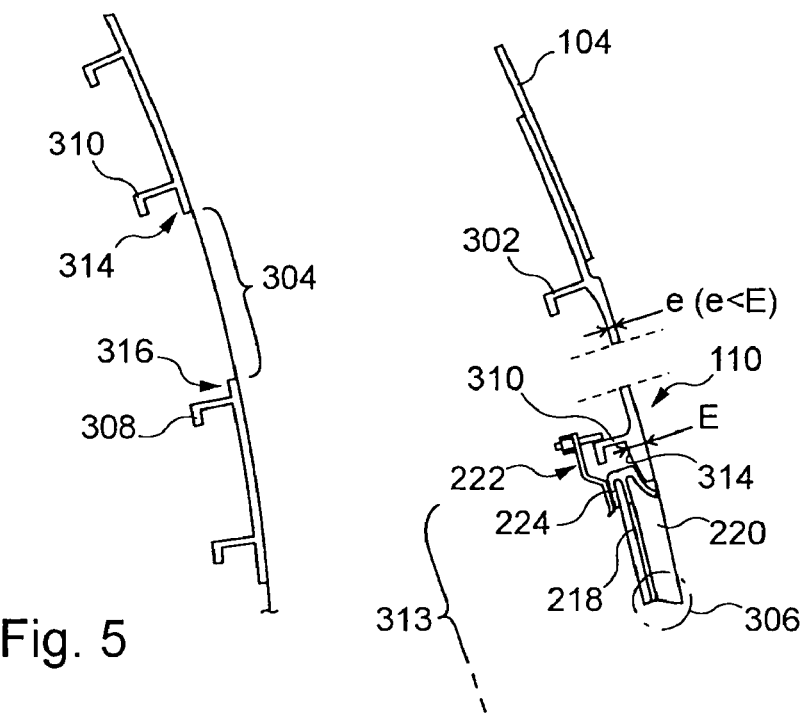
Fig. 5

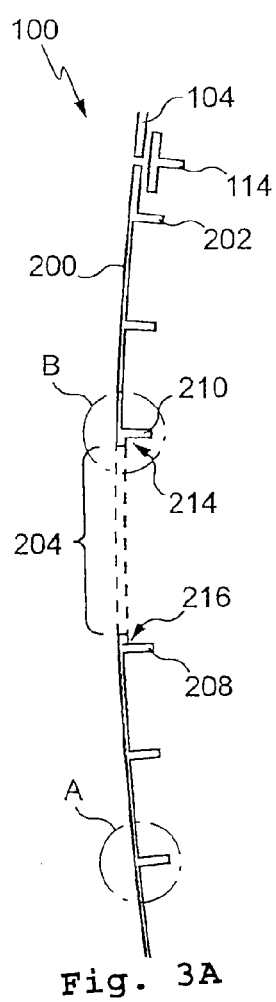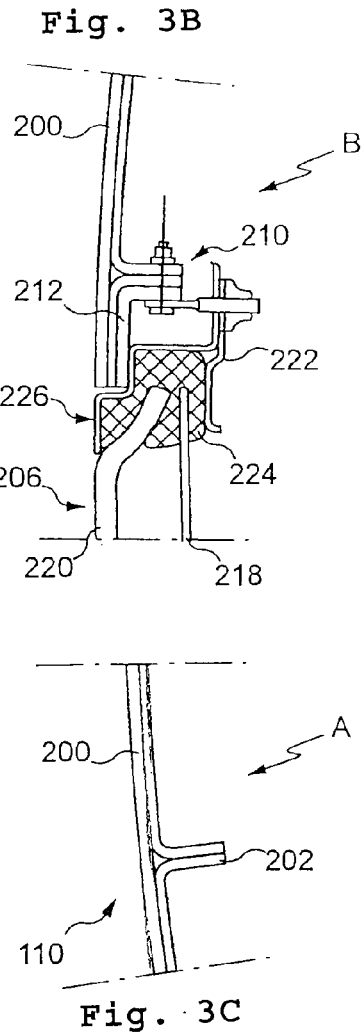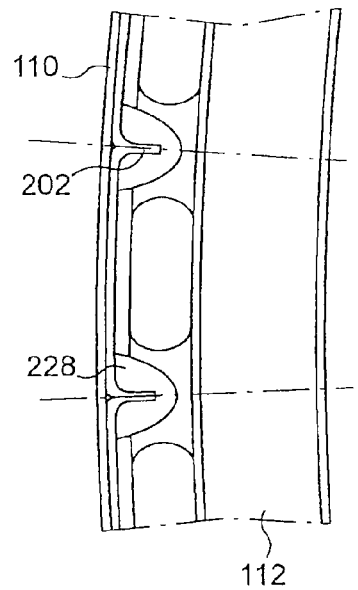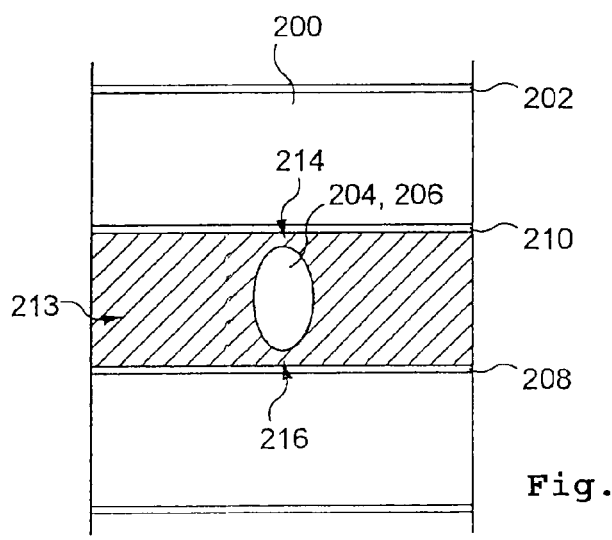

AIRCRAFT COMPRISING A WINDOW PANEL

This application claims priority from French Patent Application No. 08/51526 filed on Mar. 10, 2008, the entire contents of which are incorporated in the disclosure of the present application.

This invention relates to the design of aircraft having a composite-type fuselage and more particularly to that of aircraft fuselage panels bearing cabin windows. The invention also concerns a method of manufacturing such panels and an aircraft comprising window panels.

The window panels form part of the fuselage of an aircraft and have one or more openings at which transparent windows are positioned so as to allow the passengers to see outside.

These openings, however, constitute weakening points of the fuselage.

The window-bearing fuselage panels thus generally are provided with reinforcement elements in order to accommodate the stresses sustained by the fuselage, as shown in the documents EP1755944, EP1748879, EP1748925, EP1748926, EP1647481 and WO2007016981.

FIG. 1 presents an example of a reinforced window panel widely used in aircraft with a composite fuselage.

The window-bearing fuselage panel 1 is made of a metal alloy or of a composite material inside of which there are added on by mechanical fastenings respectively reinforcements 2 made of cast aluminum or else reinforcements made of molded or forged carbon. The cabin windows 3 intended for the passengers' vision outside then are clamped against these reinforcements 2 by means of a flange 4 squeezing a water-tight joint 5 of the window and are held by means of a certain number of removable mechanical fastenings distributed over the periphery of the window.

The mechanical fastenings for the reinforcements on the panel are identifiable on FIG. 1 by the small crosses 6. These fastenings require numerous borings and operations for the purpose of their attachment.

It thus is common to resort to more than one hundred fastenings per window, with sometimes more than a hundred or so cabin windows per aircraft. An initial drawback of the installation of added-on reinforcements therefore lies in the time necessary for the installation of these reinforcements and thus, indirectly, in the cost of producing this portion of the fuselage.

Moreover, because of the borings, the panels, for example made of composite materials, have diminished mechanical characteristics owing to the presence of holes. This is particularly the case when these materials are subjected to compressive and shearing stresses, all the more so since the windows generally are located on the side panels of the fuselages, where the fluxes of shearing stresses are the greatest. In practice, this decrease in mechanical resistance is taken into account through the use of panels of a greater thickness than would have been necessary in the absence of these borings. This results in an addition of mass on the base panel and therefore heavier panels.

Finally, these boring operations also increase the risk of accidental damage to the panel, in particular in the case of a composite material. Statistically, that corresponds to a unitary excess of panels in order to take this possible damage into account.

The invention therefore seeks to overcome these drawbacks for designing window panels for a composite fuselage.

In order to do so, the invention proposes making the bearer panel thicker in its actual structure in order to integrate the necessary reinforcements on the border of the window openings.

In this design, the invention in particular has as its object a window-bearing fuselage panel comprising a composite structure cast in one piece, the said structure comprising a main portion and at least one opening to accommodate a window, the said structure having, on a zone surrounding the said opening and having a thickness more or less constant and greater than the thickness of the main portion of the said structure.

By "composite structure cast in one piece" there is understood here an assembly in a single piece of several materials the respective qualities of which complement each other in order to form a material with overall improved performance. In particular, such a structure may reside in the superposition of glued plies made of different materials, especially one of which is other than metal. It is seen that the notion of a one-piece casting excludes the presence of fastening elements between various parts in favor of a single part obtained by machining of one piece (metal parts), or else by stacking of layers of composite (fiber/resin) material.

The reinforced area (the one with greater thickness) of this panel goes around the opening for the window and has a surface sufficient to provide support for the said window. Depending on the manufacturing methods, this zone may be adjacent to the border of the opening and thus constitute a perimeter of the opening. Nevertheless, it may be provided that this zone begins set back from the said border.

Thus, according to the invention, the reinforced zone for supporting the window is fully integrated into the composite structure itself, in that way avoiding the hundred or so fastenings required in the prior art. A composite structure may be made of a composite with an organic matrix and fibrous reinforcements in the form of continuous fibers. By way of example, this may be in the form of continuous carbon fibers in a matrix (or resin reinforced with carbon fibers known as PRFC or, according to English terminology, "Carbon Fiber Reinforced Plastic" CFRP), this matrix being thermosetting of the epoxide type or thermoplastic of the PEEK (polyether ether ketone), PEKK (polyether ketone ketone) or PPS (phenylene polysulfide) type, the fiber level in aeronautical applications being greater than or equal to 50%. In the following, when composite material is mentioned, reference is made to this type of material.

By way of example, the zone of greater thickness may represent an area equal to at least 120% of the window opening provided, in the case in which the added thickness is more or less equal to that of the set-back portion. In this way a part of the stresses associated with the opening is offset.

In standard manner, the window panels are equipped with longitudinal stringers above and below the windows so as to stiffen them. In order to compensate for the lack of material (or section) in the vertical axis of the opening provided for the window, it is provided that the panel comprises horizontal stringers arranged on both sides of the opening, the two stringers immediately above and immediately below the opening, respectively, having a section greater than that of the other stringers; in particular it has a moment of inertia greater than the other stringers with regard to flexion/torsion stressing.

In particular, the said two stringers are integrated into the said structure cast in one piece, and the said surrounding zone located between the two stringers as well as these two stringers being made thicker through integration of at least one ply into the composite structure, in particular a common ply for all these portions of the structure. This integration through folds thus furnishes, in a single manipulation, local reinforcement around the opening and reinforcement of the stringers immediately above and below the opening.

As an alternative, the said stringers may be added on by mechanical fastening on the said panel, by means, for example, of boring fastening holes in the panel.

In one embodiment, the said panel comprises at least one window made up of a plurality of plies, the said window being held supported against the said structure at the surrounding zone.

In particular, the said panel comprises a plurality of flanges, in practice at least six, ensuring the said holding. In particular, the said flanges are fastened to the said two reinforced stringers. In combination or as an alternative, the flanges for fastening the window are provided on an outer facing of the fuselage, that is, in particular, the structure with the exception of the stringers, and distributed around the said window. By way of example, these flanges may be fastened on small "inverted T" columns attached to the outer facing of the fuselage.

In a particular embodiment, the said window comprises, on its perimeter, a water-tight joint arranged to be supported on the said surrounding zone, the interposition between the window and the said structure, at the said joint, being implemented by means of a frame piece made of thin sheet metal, obtained for example by superplastic forming of such a sheet metal made of a titanium alloy possessing the property of superplasticity, for example T40 (commercially pure titanium) or TA6V, a titanium alloy containing 6% aluminum and vanadium (typically 4%). This frame at the same time imparts a minimization of the work in opening out same and a reduction of the shearing stresses applied to the joint by the angle of the structure at the opening obtained, for example, by bending.

As an alternative, it is provided that the window comprises an elastomer joint reinforced with fiber and squeezed directly against the said structure. In this way, the use of the frame made of thin sheet metal is obviated, since such a joint has shearing-stress resistance properties manifestly better than a standard joint.

In one embodiment, the said window is a stack of plies, the said external ply constituting a shaped base, so as to be best integrated into the opening implemented in the structure of the panel.

In one embodiment, the said panel comprises a plurality of openings and of windows fastened to the said openings. By virtue of techniques of integration with plies, large-size panels integrating all the cabin windows of an aircraft can be obtained easily. The assembly of the latter then is simplified.

The invention also concerns a method of manufacturing a window-bearing fuselage panel, the method comprising the construction of a composite structure cast in one piece equipped with at least one opening for accommodating a window, the construction being accomplished through integration of at least one ply such that a zone surrounding the said opening has a thickness more or less constant and greater than the thickness of a main portion of the said structure.

The implementation of an extra thickness in a composite panel is particularly easy, especially through the use of plies, with the methods and tools already used for manufacturing simpler panels.

In particular, a plurality of plies is added in the directions of the principal stresses sustained by the said fuselage, that is, orbital and longitudinal tensile stresses (due to the pressurization of the cabin), vertical and lateral bending stresses being expressed by tensions on one side and compressions on the opposite side (due to the inertial stresses generated by maneuvers or turbulences) and/or torsional stresses (especially for the rear fuselage, due to the aerodynamic stresses on the stabilizers).

In one embodiment, the said plies form a plurality of horizontal stringers provided above and below the said opening, the section of the two stringers immediately above and below that said opening having a moment of inertia greater than the other stringers. In particular, it is provided that the same ply or set of plies forms an extra thickness in the said surrounding zone and in the said two stringers.

As an alternative or in combination, it may be provided to add on horizontal stringers by mechanical fastening.

Optionally, the method may comprise steps relating to the panel characteristics presented above.

In particular, there may be provided a step of fastening, at the opening, of a window equipped with a joint, fastening being accomplished on the perimeter zone by means of a piece of thin sheet metal. An envisaged alternative consists in using an elastomer joint reinforced with fibers so as to obviate the piece of thin sheet metal and supporting the reinforced joint directly on the perimeter zone.

Furthermore, fastening of the said window may be accomplished by means of a plurality of flanges attached to the said two reinforced stringers.

The invention also concerns an aircraft comprising a composite fuselage, the said fuselage comprising at least one window-bearing panel comprising a structure cast in one piece, the said structure comprising a main portion and at least one opening to accommodate a window, the said structure having, on a zone surrounding the said opening, a thickness more or less constant and greater than the thickness of the main portion.

In this way there is obtained an aircraft with a composite fuselage in which the number of borings is markedly reduced.

In one embodiment, the said window-bearing panel is of the composite type mentioned previously.

In another embodiment, the said panel structure is made of metal material.

In this case, it is provided that the said window panel is part of a metal girding of the said fuselage. This solution makes it possible to improve the protection for the aircraft against electromagnetic disturbances, compared with the mere presence of bronze gratings on the exterior of these aircraft, the bronze grating making it possible to channel lightning, for example. In this case it also is seen that the panel plays a dual role: that of window support and that of electromagnetic protection.

In particular, the said girding may comprise frames for cockpit windows, frames for front and rear metal cabin doors (front and rear frameworks, upper lintel and lower threshold with, as an alternative, an inner metal liner also serving to protect the edge of the carbon panels of the fuselage around each door), a metal panel connecting the said window and door frames, a plurality of window panels, a rear metal band connected to the said window panels and extending up to a metal tail cone of the aircraft (traditionally the Auxiliary Power Unit compartment).

In this metal version, the said panel also may have horizontal stringers either integrated or added on by mechanical fastening, wherein the two stringers immediately above and below the opening are reinforced (section and corresponding moment of inertia) in comparison with the other stringers provided.

Optionally, the aircraft may comprise means relating to the panel and method characteristics presented above.

Other features and advantages of the invention also will become apparent in the description below, illustrated by the attached drawings, in which:

FIG. 2 is a schematic representation of a composite aircraft fuselage;

Figure 1:
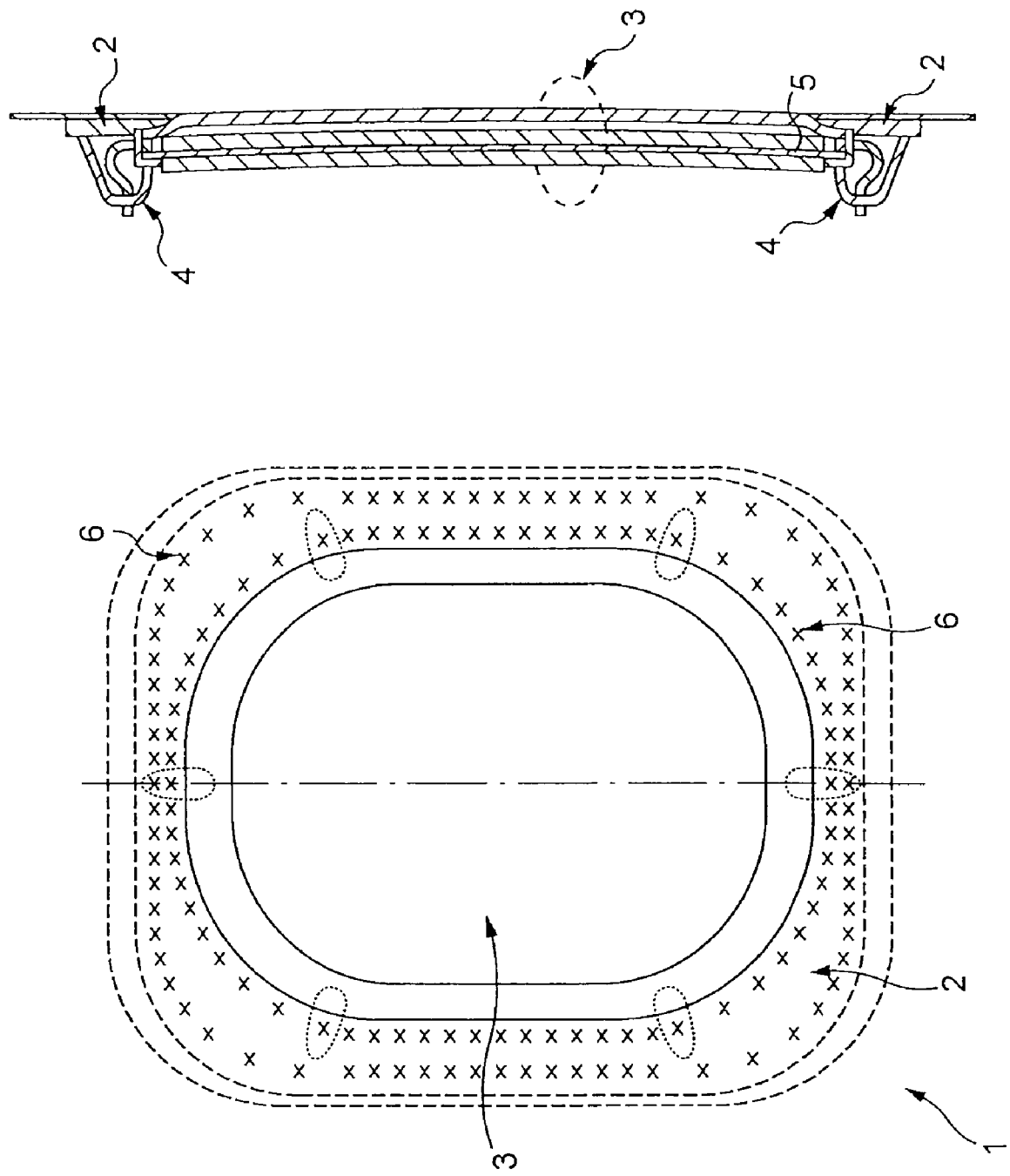
FIG. 1 represents a window integration in a composite fuselage of the prior art.

FIGS. 3A-3C schematically represent an example of a standard vertical section of a side window-bearing fuselage panel according to a first embodiment of the invention;

FIG. 3D illustrates the panel of FIGS. 3A-3C from the front;

FIG. 4 illustrates the integration of the panel of FIGS. 3A-3C into the fuselage of an aircraft; and FIG. 5 illustrates a second embodiment of the invention.

With reference to FIG. 2, an aircraft 100 has a central fuselage 102 of composite type with an upper portion 104 made of CFRP and lower portions 106 also made of CFRP. Fastened to these two portions by ad hoc means 114, for example by means of riveted inner joining strips or else by overlap of riveted panels, there is situated a window panel 206 making it possible for the passengers on board to see outside. On FIG. 2 a single panel 110 has been represented. It is contemplated as a variant, however, to have a fuselage comprising a series of several panels fastened to each other and each supporting one or more windows.

The totality of these parts and panels constitutes the skin of the aircraft and is held around a skeletal structure of the aircraft formed in particular by the frameworks 112 of the fuselage generally made of a metal material, for example of machined aluminum in the curved contours in order to minimize the purchase of aluminum plates and the associated major failures. As a variant, the frameworks may be made of another metal material, or else of composite material, for example CFRP.

A first embodiment of the invention now is described with reference to FIGS. 3A-3D, in which a window panel 110 made of composite material has been represented.

The panel 110 is curved, more or less vertical and positioned in the longitudinal direction of the aircraft 100.

The window panel 110 comprises a structure 200 with a thickness relatively small (5 to 10 mm, depending on the size of the aircraft and its level of cabin pressurization) and constant, and stringers 202 or horizontal inner stiffeners in the longitudinal direction.

As illustrated by detail "A" of FIG. 3C, these stringers 202 form an integral part of the panel 110 on the inner side of the fuselage. The structure 200 and the stringers 202 are produced in a composite material according to a more or less constant thickness, and preferably in a thermoplastic composite material obtained with the aid of PEEK, PEKK or PPS resin and carbon-fiber plies. Standard fusion-compaction techniques make it possible to obtain such panels. These manufacturing techniques, in particular through integration of plies, make it possible to obtain large-size panels easily, for example to produce in a single piece a panel comprising all the windows of one side of the cabin.

More or less at mid-height of the panel, there is provided space 204 for windows 206 between two stringers immediately (that is, the closest) below (stringer 208) and above (stringer 210). During the process of manufacturing the panel 110, one or more additional plies 212 are integrated, by draping, into the entire width of the window zone 213 and into the adjacent zones 214, 216 comprising the portions above and below the windows up to the first stringers 208 and 210. This integration of added plies is implemented in the directions most suited to taking up of the stresses prevailing at the opening provided for the windows, typically the shearing stresses Z due to the vertical shear stress, the orbital tensile stress Z and the longitudinal tensile stress X due to the cabin pressurization, X being along the longitudinal axis of the aircraft and Z following the vertical.

These plies are extended onto the two stringers 208 and 210. It follows therefrom that these stringers 208 and 210, manufactured at the same time as the rest of the panel 110 have higher mechanical properties than the "standard" stringers 202 of the zone of the fuselage in which the windows are positioned, in particular owing to the presence of a stronger section and of a greater inertia.

The panel 110 has a constant thickness all along the panel between the two stringers 208 and 210. The additional thickness provided by the plies specially arranged in this zone makes it possible to do without the window reinforcement and the associated fastenings. The additional thickness may be on the order of magnitude of that of the structure 200, that is, from 5 to 10 mm.

An opening 204 is implemented in this composite panel 110, for example by bending. This opening 204 is provided in the size of the window to be installed.

In this way there is obtained a sturdy assembly cast in one piece, comprising only a minimum of holes for holding the window flanges, but avoiding the multitude of holes required for fastening the reinforcements for window openings of the prior art.

A window 206 of circular or oval shape then is fastened at the opening 204.

There may be used in particular a standard structure for a window 206 having a double glazing of poly(methyl methacrylate) with interposition of an air layer. The inner ply 218 is distinguished from the outer ply 220.

The latter 220 is shaped in the form of a base (see detail "B" of FIG. 3) in order to be best integrated into the contour of the opening 204 implemented, unlike a ply having a slanting machined border. The inner ply 218 is of constant thickness.

The window 206 is held pressed against the panel 110 at the reinforced zone 214, 216, by the use of several flanges 222, for example at least 6.

Preferably, all or a portion of these flanges 222 are fastened to the reinforced stringers 208 and 210 by means of special fastenings. On detail "B" of FIG 3B, a threaded stem is fastened to the stringer 210 by a fastening of the bolt-and-nut type. The threaded stem traverses the flange 222, and the latter is fastened to the stem by a nut. In this configuration, a minimum of two fastenings 222 on the upper stringer 210 and two fastenings on the lower stringer 208 are provided.

As an alternative or in combination for additional fastenings, a flange 222 may be fastened onto small "inverted T" columns, themselves fastened onto the outer facing (200) of the fuselage and distributed all around the window 206.

The flanges 222 press, against the reinforced zone (213, 214, 216), a joint 224 surrounding the window 206 and confining the ends of the inner ply 218 and outer ply 220.

A joint 224 made of elastomer reinforced with fibers, for example of silicone reinforced with terylene fabric, may be used. Such a resistant joint may be applied directly on the panel 110 at the reinforced support zone 214, 216.

There also may be used less resistant joints 224 such as made of pure silicone. In this case, with a view to minimizing shearing of the joint (as a matter of fact, in the prior art the joint advantageously is supported on a very evolutionary section of the reinforcement and the lateral window panels are situated at the locations of the aircraft that are most subjected to shearing stresses), there is provided a frame 226 for the window 206 made of thin sheet metal, for example of SPF Titanium ("Super-Plastic forming" according to English terminology) such as T40 or TA6V.

The window 206 then partially covers the composite panel of zone 214 or 216 in projection in order to minimize the work of opening out this window frame 226, merely glued to the water-tight joint 224 inside the panel.

FIG. 4 shows the structure of a framework 112 made of extruded aluminum for the fuselage having openings 228 in order to allow passage of the stringers 202, 208 and 210 integrated into the panels 104, 106, 110 forming the skin of the fuselage.

A plurality of such frameworks is provided all along the fuselage of the aircraft.

These frameworks 112 are fastened to the panels 104, 106 and 110 by rivets. In particular, these frameworks 112 pass, at the window panels 110, into a zone separating two consecutive windows 206. In this way the framework 112 may be fastened to the reinforced zone 213, at the same time stiffening the overall fuselage of the aircraft.

With reference to FIG. 5, there now is described a second embodiment of the invention in which the aircraft 100 has a panel 110 bearing windows 306 made of metal material, for example of Titanium.

This panel 110 has the same properties as the one presented above with reference to FIGS. 2 to 4, in particular in that it has an increased thickness E (zone 314) between the two stringers 308 and 310 situated immediately above and below the opening 304 provided. These two stringers 308 and 310 are themselves reinforced in that they have a stronger section and inertia than the "standard" stringers 302 of the fuselage zone in which the windows 306 are positioned. By way of example, a sheet metal with a thickness e on the order of a few millimeters (5 to 10 mm) having a thickness E on the order of 15 mm around the opening 304 may be used.

This panel 110 may be made from an extruded profile extending over the entire width of the zone of the windows 306 and into the adjacent zones 314, 316 which comprise, above and below the windows 306, at least one stringer (or stiffener) 308, 310 also integrated into the profile. The said profile 110 may be worked up in places by machining for an optimization of the masses if necessary. In this way there is obtained a solid whole cast in one piece, comprising only a minimum of holes for the holding of the window flanges, but avoiding the multitude of holes required for fastening the window opening reinforcements of the prior art.

The integration of the stringers 308, 310 and possibly 302 may be accomplished by adding, through co-bonding, on a thin sheet metal of a few millimeters (with a thicker central zone 313) of fired stringers made of composite material. One then proceeds by gluing with interposition of a film of glue between the panel and a pre-fired stiffener prior to polymerization autoclaving.

As an alternative, this panel 110 may be made from a laminated metal plate, worked up by mechanical machining and forming. This plate extends over the entire width of the window zone and into the zones 314 and 316. As a variant in order to reduce the quantity of metal purchased, the stringers 308 and 310 may be added on with mechanical fastenings, as they are traditionally on a metal fuselage.

In another embodiment, it is provided to make this panel 110 from a forged plate, worked up by mechanical machining, the said plate extending over the entire width of the window zone and into the zones 314 and 316.

The window panel 110 obtained in this way comprises a "mesh bottom" (that is, the smallest thickness of the panel when the latter is, for example, machined with honeycomb structure in order to make it lighter as mentioned in the applications EP 1 569 058 and EP 1 564 135) with a thickness E that is constant, or able to be optimized in places by machining, around the windows 306 and up to the closest stringers 308, 310 situated above and below, respectively.

The assembly of the windows 306 may be accomplished according to the same principles as for the composite version illustrated by FIGS. 2 to 4.

Again with reference to FIG. 5, the panel 110 may be integrated into a setup for grounding of the on-board equipment. This setup constitutes an electric girding of the aircraft making use of a Faraday effect to combat electromagnetic disturbances. Thus, in this embodiment, the panels 110 fulfill a dual role: on the one hand they support the windows, and on the other hand, they contribute to an electromagnetic protection.

This girding comprises at least the frames 320 of the cockpit windows, metal panels 322, 324 connecting various frames of the girding, the frames 326, 328 of metal front and rear cabin doors (front and rear frameworks, upper lintel and lower threshold with, as an alternative, an inner metal liner also serving to protect the edge of the carbon panels of the fuselage around each door), all the window panels 110 (generally on the two lateral sides of the aircraft), a rear metal band 330 extending to the metal tail cone (traditionally the compartment for the on-board auxiliary set or "Auxiliary Power Unit"). In the case of a rear-engine aircraft, the latter rear band 330 is positioned on the zone for attachment of engine struts.

The preceding examples are merely embodiments of the invention, which is not limited thereto.

The invention claimed is:

1. A window-bearing fuselage panel, comprising:
   a plurality of horizontal stringers;
   a composite structure cast in one piece, the composite structure comprising a main portion having a thickness and the composite structure comprising at least one opening to accommodate a window,
   wherein two horizontal stringers of the plurality of horizontal stringers are arranged on two opposite sides of the opening, the two horizontal stringers located immediately above and immediately below the opening, and have a cross-sectional thickness greater than that of other horizontal stringers of the plurality of horizontal stringers on the fuselage panel, and
   a zone of the composite structure surrounding the opening between the two horizontal stringers has a thickness substantially constant and greater than the thickness of the main portion of the composite structure.

2. The panel according to claim 1, wherein the two horizontal stringers are integrated into the structure cast in one piece, and the surrounding zone situated between the two horizontal stringers as well as the two horizontal stringers having an increased thickness through integration of at least one ply in the composite structure.

3. The panel according to claim 2, wherein the surrounding zone and the two horizontal stringers have at least one common thickening ply.

4. The panel according to claim 1, further comprising:
   at least one window made up of a plurality of plies, the window being held supported against the structure at the surrounding zone.

5. The panel according to claim 4, wherein the window is held supported with the aid of a plurality of flanges fastened to the two horizontal stringers.

6. The panel according to claim 5, further comprising:
   flanges for fastening of the window provided on an inner side of an outer skin of the fuselage and distributed around the window.

7. The panel according to claim 6, wherein the flanges are fastened on small inverted T-shaped columns fastened on the inner side of the outer skin of the fuselage.

8. The panel according to claim 4, wherein the window comprises an elastomer joint reinforced with fiber and squeezed directly against the structure.

9. The panel according to claim 8, wherein an outer ply of the plurality of plies includes a base shaped so as to conform to the opening.

10. The panel according to claim 1, further comprising:
at least one window having, on its perimeter, a water-tight joint arranged so as to be positioned and supported on the surrounding zone, interposition of the water-tight joint between the window and the structure, at the joint, being implemented by a frame piece made of thin sheet metal.

11. An aircraft comprising a panel according to claim 1.

* * * * *